April 22, 1941.  J. A. THOMAS  2,239,278
METERING DEVICE FOR COMPRESSED SO₂
Filed Aug. 27, 1938
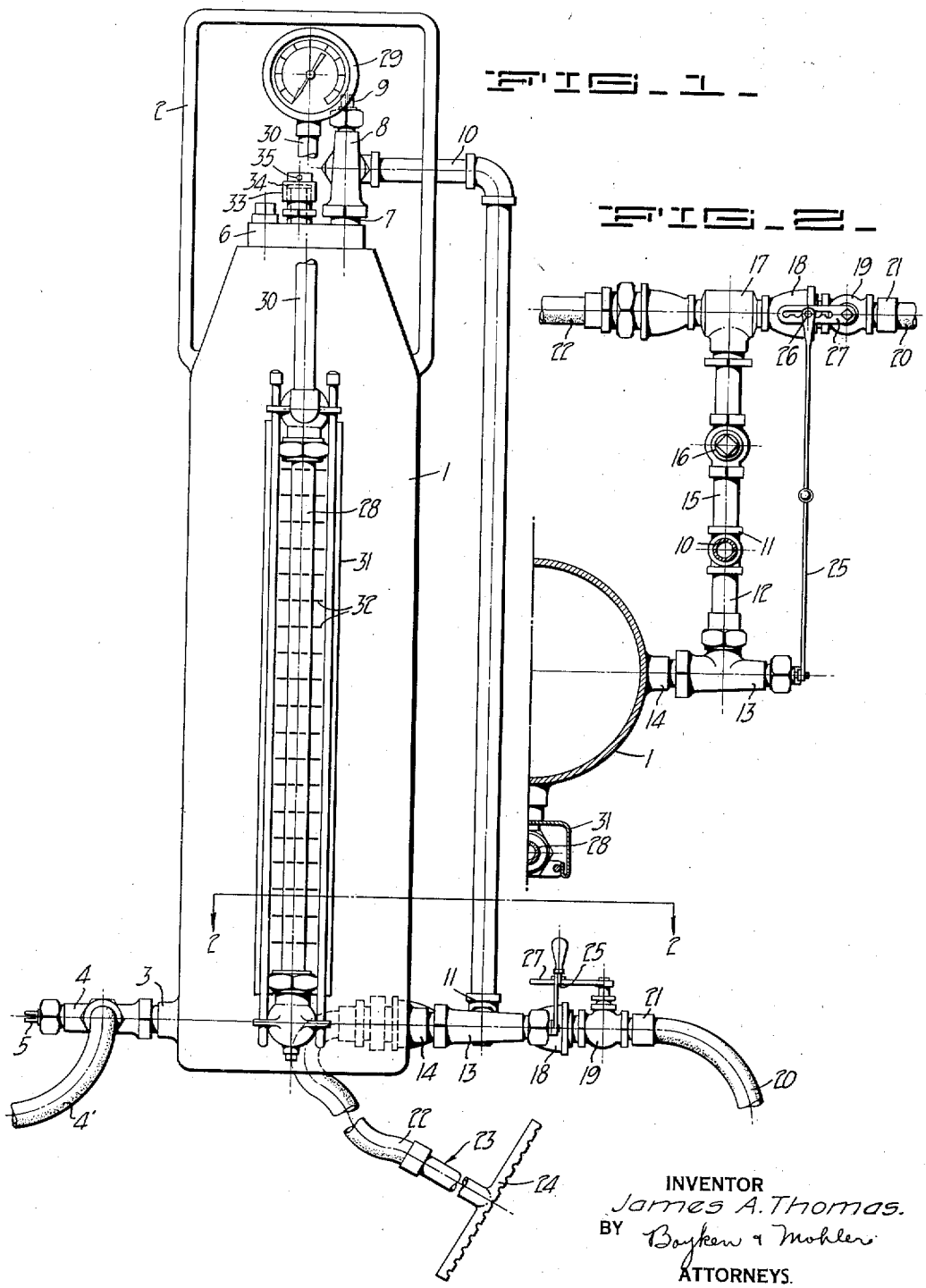
INVENTOR
James A. Thomas.
BY Boyken & Mohler
ATTORNEYS.

Patented Apr. 22, 1941

2,239,278

UNITED STATES PATENT OFFICE 2,239,278

METERING DEVICE FOR COMPRESSED SO₂

James A. Thomas, Berkeley, Calif., assignor to Esotoo Fumigation Co. Ltd., San Francisco, Calif., a corporation of California Application August 27, 1938, Serial No. 227,159

2 Claims. (Cl. 299—84)

This invention relates to a metering device and has for its objects simple, safe, portable and compact apparatus including a tank, for dispensing a desired quantity of compressed gas, such as liquid SO₂ into wine or elsewhere, as desired, and which tank is provided with means for quickly refilling the same. Another object is the provision of apparatus, as above described, for use in wineries or elsewhere, and which apparatus is provided with means for combining the gas with a desired amount of flowing water prior to dispensing the gas whereby the gas is in solution and there is no escape of free gas to cause undesirable odors. A still further object is the provision of means for releasing free gas generated in the tank into the water so as to prevent any undesirable pressure in the tank containing the compressed gas. Other objects and advantages will appear in the specification and drawings annexed hereto.

In the drawing, Fig. 1 is an elevational view of my apparatus and Fig. 2 is a sectional view taken along the line 2—2 of Fig. 1.

Briefly described, my improved apparatus comprises a vertical tank 1 for the liquid SO₂, which tank is provided with a carrying handle 2 at its upper end, an inlet 3 conduit for gas at the lower end of the tank, provided with a valve 4 having a valve actuating stem 5 projecting therefrom for opening and closing the valve. An inlet conduit 4' connects with a source of supply of liquid gas (not shown).

At the upper end of the tank, projecting upwardly from the top 6 thereof is a gas outlet 7 provided with a valve 8 having a valve actuating stem 9, and which valve connects with one end of a gas line 10, which gas line connects at its opposite end with the leg of T fitting 11, one arm of which connects with one end of a pipe 12. The opposite end of pipe 12 connects with a valve 13 on a liquid gas outlet 14 at the lower end of tank 1.

Extending from the other arm of the fitting 11 is a pipe line 15 having a check valve 16 interposed thereon, the outer end of said line 15 connecting with the leg of a T fitting 17. One end of said T fitting connects with a water conduit 18 provided with a valve 19 for controlling the flow of water from a main source of supply such as a water main or supply tank (not shown) for passing water through a hose section 20 to the valve, and if desired, a conventional pressure and flow device 21 may be interposed between the water supply and the valve 19 to insure a constant flow of water to the valve for preventing any variation in flow of water through said valve at any degree of opening of the valve.

The opposite arm of the fitting 17 connects with a hose 22, which hose is provided with a distributing nozzle 23 at its outer end. In the drawing, said nozzle comprises a T-shaped element in which the leg is relatively long, providing a handle, and the head, or cross member 24 is provided with a row of orifices for ejection of the gas.

While valves 13, 19 may be independently actuated, I may provide a connecting link 25 between the two adapted to simultaneously actuate the valves for opening the valves to the desired degree for insuring that the correct amount of liquid SO₂ is mixed with the water flowing to pipe 22 and into the nozzle 23, and which ratio may be modified to meet any desired condition by shifting the pin 26 connecting one end of link 25, along the arm 27 that connects with valve 19.

Alongside the tank 1 is a heavy vertical gage glass 28 connecting at its upper and lower ends, by conventional fittings, with the interior of the upper and lower ends of the tank. A pressure gage 29 may connect with the upper fitting of the gage glass by a pipe 30, if desired.

Partially surrounding the glass 28 is a sturdy channel 31, of metal which carries the graduations 32 therein, which graduations are in terms of weight or volume as desired, such as pounds, or pints or fractional values thereof.

At the top of the tank, I also provide a conventional thermally actuated safety valve 33 having a disk 34 of fusible metal therein adapted to melt at a predetermined temperature, for opening the gas to flow through an outlet 35 in the valve outwardly of said disk.

In operation, the liquid inlet conduit 4' is connected with the supply tank of compressed gas, which gas flows into the tank 1, the valve 8 at the top being opened to permit escape of air or volatilized gas that is within the tank and then closed after the tank is filled.

After the tank 1 is filled, the valve 4 is closed and the conduit 4' disconnected therefrom.

Assuming the wine in a fermenting tank is to be treated. Since these tanks contain a known amount of wine, it is readily determined how much SO₂ gas, either by weight or volume, should be admitted thereto.

The operator then merely connects the water inlet conduit 20 with the source of water supply and actuates valves 13, 19 to permit the liquid SO₂ to pass into the T fitting 17 where it mixes with the water in the desired proportions to insure against an excess of gas passing to the water for going into solution therewith without discharge of free gas. The end 24 of the nozzle is inserted into the tank of wine and may be stirred around in the wine as desired, ejecting the $SO_2$ laden water into the wine until the gage 23 shows that the desired amount of $SO_2$ has passed into the tank, when valves 13, 19 are closed and the nozzle 23 withdrawn.

It sometimes occurs that a certain amount of $SO_2$ gas has formed on top of the liquid $SO_2$ in the tank 1, and which would create an undesirable pressure in the tank, and this gas is readily passed into the water in line 22 by merely opening valve 8 to permit the gas to by-pass through pipe 10 into pipe 12 with the liquid gas passing to the T fitting 17, and, of course, such gas alone may be discharged into the water line 22 by merely opening valve 8.

The check valve 16, of course, prevents any water from passing back through line 12 to line 10 or valve 13.

The valves 4, 8 and 13 are conventional valves of the needle-valve type, hence are not shown in detail, and the construction otherwise, is believed to be obvious from the drawings.

The T fitting 17 functions in the same manner as an injector this type of fitting being conventional and known in the trade as a "Penberthy" ejector, the through passageway for the water being generally of Venturi form, with the opening for gas being at the restricted throat, thus the flowing water draws the gas into the water stream that flows to the nozzle. The opening of valves 13, 19 is such as to produce from about a 4% to 6% solution at the T fitting. Such solution, continuously ejected into the expressed juice in the fermenter through the nozzle, will inactivate the wild yeast and mold species without retarding the activity of the true wine yeast.

It is, of course, obvious that compressed air or steam may be used instead of water in the line 22 for conducting the compressed gas to the nozzle, which is done in certain instances in the cleaning of barrels and the like, and in treating the finished wine where it is desirable that no water be added. Where the steam is wet, it will take up the $SO_2$ gas without creating any appreciable odor, and the distribution of the $SO_2$ laden steam in barrels has been found to be highly efficient.

Having described my invention, I claim:

1. A relatively small, manually carryable and movable device for use in dispensing an aqueous solution of $SO_2$ into wine and the like, comprising a tank for liquid $SO_2$ provided with a valved inlet and a valved outlet at the lower end thereof for filling said tank with liquid $SO_2$ from said lower end and for withdrawing said liquid $SO_2$ directly from said lower end, an open-ended conduit for water, a passageway extending from a point intermediate the ends of said conduit to said valved outlet for conducting liquid $SO_2$ from the latter to within said conduit at said point, means on said tank arranged and adapted to visibly indicate in terms of predetermined quantities the amount of liquid $SO_2$ withdrawn from said tank through said valved outlet for passage into said conduit, separate means at opposite ends of said conduit for removably connecting said ends with a supply of ordinary water under pressure and with a discharge nozzle, respectively, valve means in said conduit for controlling the flow of water therethrough, a gas conduit connecting between said passageway and the upper end of said tank for passing gas from above liquid $SO_2$ in said tank into said passageway, and a valve in said gas conduit for controlling the passage of gas therethrough whereby the gas may be passed to the water in the water conduit as desired.

2. A relatively small, manually carryable and movable device for use in dispensing an aqueous solution of liquid $SO_2$ into wine or the like, comprising a tank for liquid $SO_2$ provided with a valved inlet and a valved outlet at the lower end thereof for filling said tank with liquid $SO_2$ from said lower end and for withdrawing said liquid $SO_2$ directly from said lower end, an open-ended conduit for ordinary water, a passageway extending from a point intermediate the ends of said conduit to said valved outlet for conducting liquid $SO_2$ from the latter to within said conduit at said point, means on said tank arranged and adapted to visibly indicate in terms of predetermined quantities, the amount of liquid $SO_2$ withdrawn from said tank through said valved outlet for passage into said conduit, separate means at opposite ends of said conduit for removably connecting said ends with a supply of water under pressure and with a discharge nozzle, respectively, valve means in said conduit for controlling the flow of water therethrough, a check valve in said passageway automatically closing the latter to flow of liquid therein from said conduit to said valved outlet, but open for flow in the opposite direction, a gas pipe connecting between the upper end of said tank and said passageway at a point between said check valve and said valved outlet, and a valve in said gas pipe for controlling the flow of gas from said upper end of the tank to said passageway.

JAMES A. THOMAS.